US005229802A

United States Patent [19]

Shiota et al.

[11] Patent Number: 5,229,802

[45] Date of Patent: Jul. 20, 1993

[54] DEVELOPED PHOTOGRAPHIC FILM CONTAINING METHOD AND APPARATUS, AND FILM CASSETTE OR USE THEREIN

[75] Inventors: Kazuo Shiota; Ken Kawada, both of Kanagawa, Japan

[73] Assignee: Fuji Photo Film Co., Ltd., Kanagawa, Japan

[21] Appl. No.: 756,949

[22] Filed: Sep. 9, 1991

[30] Foreign Application Priority Data

Sep. 7, 1990 [JP] Japan ........................ 2-238036

[51] Int. Cl.[5] .................. G03B 17/26; G03D 13/08

[52] U.S. Cl. .......................... 354/275; 354/34 D; 354/354

[58] Field of Search .................. 354/275, 317-324, 354/354; 355/72; 242/71, 71.1, 71.2, 71.6, 74, 74.1, 74.2

[56] References Cited

U.S. PATENT DOCUMENTS 4,023,194 5/1977 Batter, Jr. .................... 354/317

5,083,155 1/1992 Kataoka et al. ............. 354/275 X

FOREIGN PATENT DOCUMENTS 2658748 3/1989 Fed. Rep. of Germany .

*Primary Examiner*—D. Rutledge

*Attorney, Agent, or Firm*—Sughrue, Mion, Zinn, Macpeak & Seas

[57] ABSTRACT

A photographic film cassette has a connecting sheet of which a trailing end is fixed on a spool, and a front end is drawn out from a cassette shell through a film passage mouth beforehand. A developed photographic film is connected to the front end of the connecting sheet drawn out of the cassette shell. The spool is rotated to wind up the developed film in the cassette shell with the connecting sheet. In a preferred embodiment, before developing the photographic film after exposure, the exposed film is drawn out of the cassette shell, and is cut on a film trailer. As a result, the exposed film is separated into a first portion and a second portion left on the spool with a front end of the second portion drawn out. The second portion is provided as the connecting sheet. Further, a hot-melt adhesive agent is applied to the photographic film in a position to be the front end of the second portion.

21 Claims, 5 Drawing Sheets

DEVELOPED PHOTOGRAPHIC FILM CONTAINING METHOD AND APPARATUS, AND FILM CASSETTE OR USE THEREIN

BACKGROUND OF THE INVENTION

1. Field of the Invention

The present invention relates to a method of and apparatus for containing a photographic film after development in a film cassette, and to a film cassette for containing the same. More particularly, the invention relates to an improvement of containing a developed film in a film cassette.

2. Description of the Related Art

When a laboratory receives an order from a customer for processing a 135-type photographic film after exposure, an exposed film is drawn out of a cassette shell, developed, cut into film pieces of a predetermined length, e.g. of six image frames, inserted in a film sheath, and given back to the customer together with photoprints printed from the developed film. Conventionally, a photofinisher unwinds and separates an exposed film from the cassette shell for developing and printing, and throws the emptied cassette shells away.

However, it is inconvenient to handle film pieces that are cut to a predetermined length, because the film pieces require rather a lot of space. This procedure also is inefficient because a further process is necessary to insert the film pieces in the film sheath, in addition to a process to cut an exposed film in a laboratory into shorter film pieces. Reprinting or extra printing of a developed film cannot be performed efficiently, because separated film pieces are spliced together to form a longer strip. A great number of emptied cassette shells have been thrown away as industrial waste, which is undesirable in view of economy of resources and protection of the environment.

In U.S. patent application Ser. No. 07/622,032, filed on Dec. 4, 1990, and assigned to the assignee of the present application, a film containing or preserving method is proposed in which the photographic film is separated from the cassette shell, developed, and wound into the same cassette shell after printing in order to preserve it. However, this method still presents a problem in that insertion of the film leader into the film cassette requires a particular technique, which is restricted by the shape of the spool, the photographic film and the like, and involves great difficulty in actual production.

SUMMARY OF THE INVENTION

In view of the foregoing, it is an object of the present invention to provide a developed photographic film containing method and apparatus, and a film cassette, by which a photographic film can be wound up in a cassette shell with great ease.

It is another object of the present invention to provide a developed photographic film containing method and apparatus, and a film cassette, in which industrial waste is reduced by reusing a cassette shell even after developing photographic film.

In order to achieve the above and other objects and advantages of this invention, a cassette includes a connecting sheet of which a first end is fixed on the spool, and a second, opposite end is drawn out of the cassette shell beforehand through a film passage mouth. The developed film is connected to the second end of the connecting sheet drawn out of the cassette shell. The spool is rotated to wind up the developed film in the cassette shell with the connecting sheet. Therefore, the photographic film can be handled with great ease.

In accordance with a preferred embodiment, before developing the photographic film after exposure, the exposed photographic film is drawn out of the cassette shell. The exposed film is cut on a film trailer, thereby being separated into a first portion and a second portion left on the spool with a front end of the second portion drawn out, the second portion being provided as the connecting sheet. Industrial waste, thus is reduced by reusing the cassette shell even after developing the photographic film.

Further, a hot-melt adhesive agent is applied to the photographic film in a position so as to constitute the front end of the second portion. The photographic film can be connected to the cassette shell with still greater ease.

BRIEF DESCRIPTION OF THE DRAWINGS

The above and other objects and advantages of the present invention will become more apparent from the following detailed description when read in connection with the accompanying drawings, in which.

DETAILED DESCRIPTION OF THE PREFERRED EMBODIMENT

Figure 1:
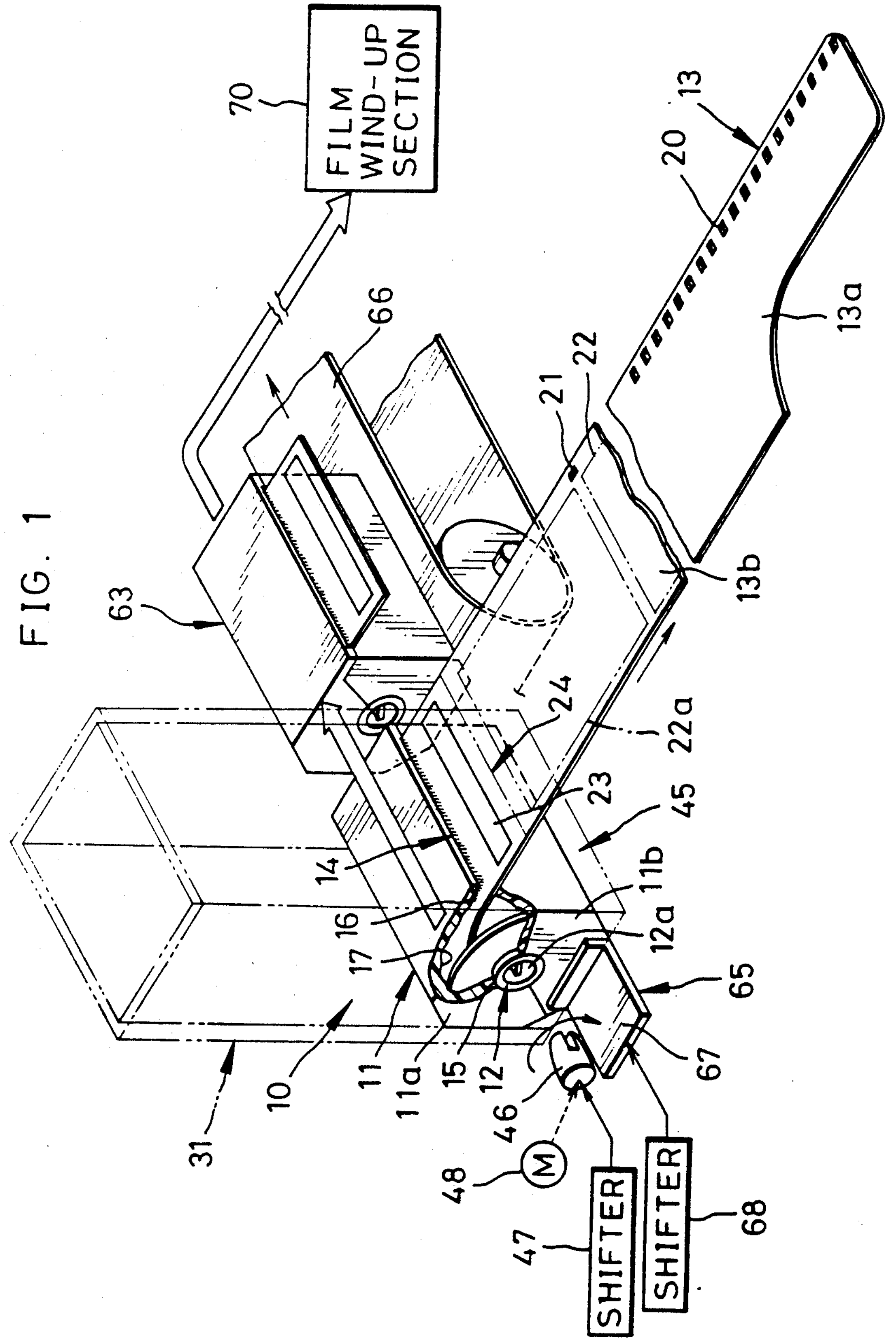
FIG. 1 is perspective view of a film pull stage in a film processor for use in a developed photographic film containing method according to the present invention, and a film cassette positioned therein.

In FIG. 1, a photographic film cassette 10 is constituted by a cassette shell 11, a spool 12 rotatably supported in the cassette shell 11, and photographic film 13 wound about the spool 12 with the film trailer fixed thereon.

The cassette shell 11 is formed in the shape of a prism by joining shell halves 11*a* and 11*b* molded from synthetic resin. The cassette shell 11 is provided with a film passage mouth 14 for passing the photographic film 13, and openings 15 for supporting the spool 12 and for exposing a coupling end 12*a* to the outside. Plush or light trapping fabric 16 is attached to the film passage mouth 14. A film containing chamber 17, defined inside the cassette shell 11, has an internal diameter substantially equal to the maximum diameter of the photographic film 13 as wound about the spool 12.

When the spool 12 is rotated in the film unwinding direction by inserting a fork 46 in the coupling end 12*a*, a leading end of the photographic film 13 is guided by the inside surface of the film containing chamber 17, and is advanced to the outside of the film passage mouth 14. It is noted that the cassette shell 11 is shaped to be a box-like prism to ensure stability when a plurality of film cassettes are piled one on top of another, but the shell also may be cylindrical, as in a conventional film cassette.

A film leader 13*a* has one side cut off, as is well-known in the art, to reduce resistance to feeding the photographic film 13 when advancing the film leader 13a and feeding the photographic film 13 toward a take-up spool in a camera. The lateral side of the film leader 13a opposite the side that is cut off is provided with perforations 20 so as to engage a film threading member of the camera for feeding the film leader 13a to the take-up spool after being let out of the cassette shell 11. A film main portion 13b of the photographic film 13 is provided with positioning perforations 21, one for each of the frames 22 to be exposed. The perforations 21 are detected either mechanically or optically in order to position each of the frames 22 to be exposed on an aperture of the camera.

When the photographic film 13 is drawn out fully from the cassette shell 11, a layer of hot-melt adhesive area 23 is formed between a final frame 22a to be exposed and the spool 12 on a back surface opposite the photosensitive emulsion surface of the photographic film 13. When all of the exposed film 13 is drawn out of the cassette shell 11 for development, the exposed film 13 is cut along a line between the final image frame 22a and the hot-melt adhesive area 23 so as to keep the hot-melt adhesive area 23 attached to the cassette shell 11. Such a cutting line 24 is indicated virtually by the two-dot-dash line in FIG. 1. The cutting line 24 separates the photographic film 13 into a first film portion constituted of the film leader 13a and the film main portion 13b, and a second film portion of the film trailer left on the cassette shell 11. The second film portion is used as a connecting sheet for connecting the exposed film 13 after development to the spool 12.

It is noted that the hot-melt adhesive area 23 may be formed on the photosensitive emulsion surface or on both surfaces of the photographic film 13. When both surfaces are provided with an adhesive area, efficiency in the developing process is improved because either adhesive area may be used for connecting the developed film 13.

Figure 2:
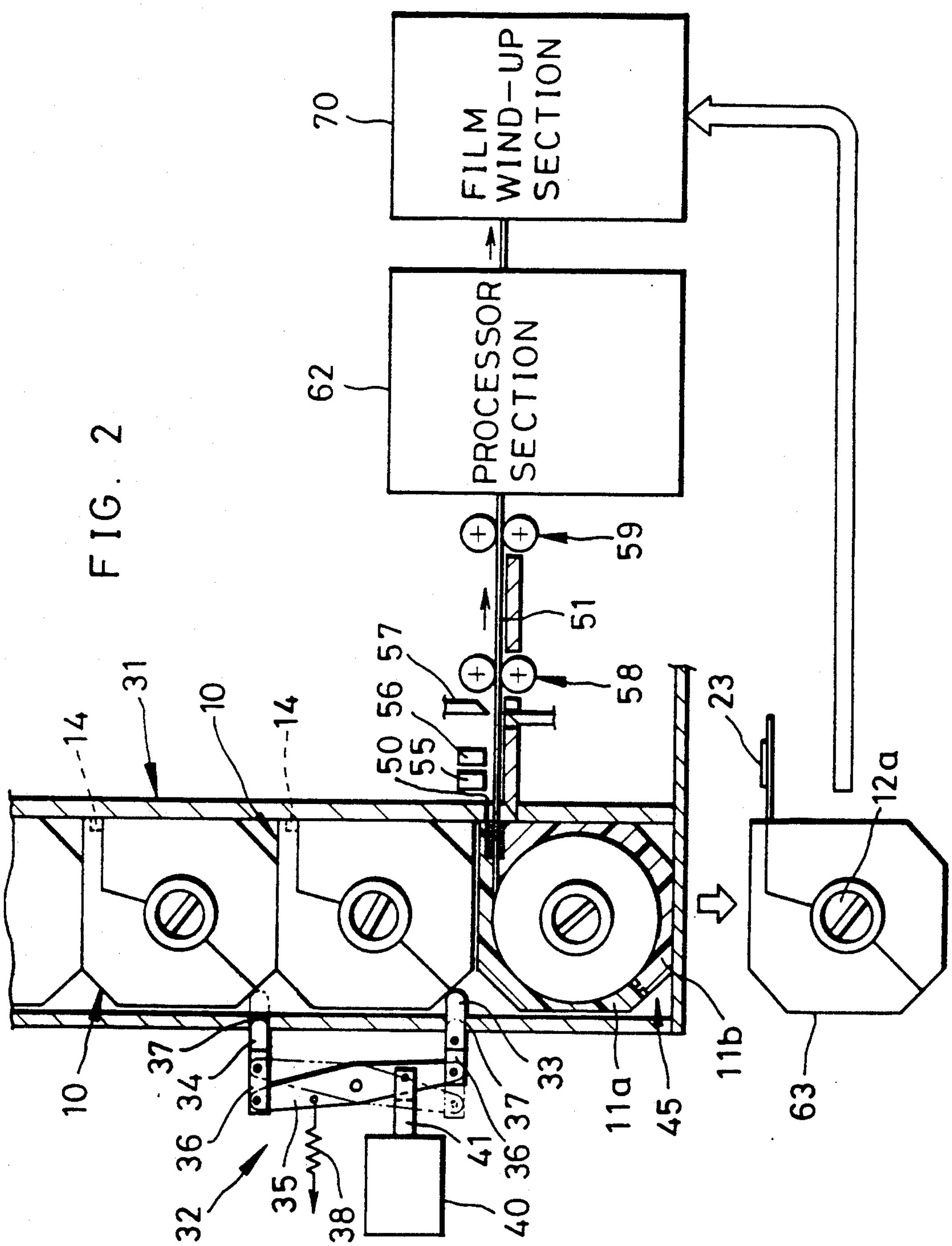
FIG. 2 is a schematic view of a film feeding section of the film processor shown in FIG. 1.

In FIG. 2, showing a film processor for developing the photographic film 13 exposed by loading the film cassette 10, a cassette holder 31 is formed in the shape of a rectangular elongated box, in which a plurality of film cassettes are contained with their film passage mouth 14 directed in the same direction. The lower portion of the cassette holder 31 is provided with a cassette feeding mechanism 32 which includes lower and upper stopper pins 33, 34 which project retractably into the cassette holder 31. The stopper pins 33, 34 are supported swingably on both ends of an arm 35 by means of connecting members 36, and project alternately into the cassette holder 31 through guide holes 37 in correspondence with a displacement of the arm 35. A coiled spring 38 biases the arm 35 so that the lower stopper pins 33 project into the cassette holder 31.

A solenoid 40, connected to the arm 35 by means of a plunger 41, displaces the arm 35 in excitation in order to alternate projection of the stopper pins 33, 34. A single film cassette, positioned by itself between the lower and upper stopper pins 33 and 34, falls on a film pull stage 45. After the cassette falls, the solenoid 40 is deenergized to return the arm 35 to the home position indicated by the solid line by means of the coiled spring 38. Instead of using the stopper pins linked by the arm 35 to position the film cassette 10 alone, the stopper pins may be driven separately by using two solenoids or the like.

As shown in FIG. 1, the film pull stage 45 is provided with the fork 46 which is slidable in the axial direction of the spool 12. A shifter 47 shifts the fork 46 in the axial direction to displace it from a retracted position to a position for engaging the fork 46 with the coupling end 12a of the spool 12. A motor 48 rotates when the engaging position is taken so as to rotate the spool 12 in the unwinding direction, and thus advance the film leader 13a outside the film cassette 10.

As shown in FIG. 2, a feeding passage 51, formed from a film passage mouth 50 of the film pull stage 45, is provided with a leading end sensor 55, a sensor 56 for detecting the hot-melt adhesive area 23, a cutter 57, a pair of drawing rollers 58, and a pair of feeding rollers 59 disposed in that order along the feeding passage 51. The leading end sensor 55 detects the film leader 13a fed in the feeding passage 51. The drawing rollers 58 then start rotating to feed the exposed film 13 to the feeding rollers 59. The rotation of the drawing rollers 58 and the feeding rollers 59 is controlled so as to store provisionally a predetermined length of film between the drawing and feeding rollers 58 and 59 in a stand-by fashion for cutting by the cutter 57. The exposed film 13 is fed in a processor section 62 by the drawing and feeding rollers 58 and 59.

After drawing all of the exposed film 13 out of the cassette shell 11, the sensor 56 optically detects the adhesive area 23 on the film trailer of the exposed film 13 as shown in FIGS. 1 and 2. The drawing rollers 58 stop rotation upon detection of the adhesive area 23. The cutter 57 then is actuated to cut the exposed film 13 along the virtual cutting line 24 in front of the hot-melt adhesive area 23 so as to separate the exposed film 13 from the cassette shell 11. Although the film trailer is detected by detecting the adhesive area 23 in the present embodiment, as an alternative it may be detected by detecting a displacement of the cassette shell or a tension of drawing the exposed film in the feeding direction when drawing out the whole film.

A cassette ejecting mechanism 65, constituted by an ejecting bracket 67 and a shifter 68 for shifting the ejecting bracket 67 in the axial direction of the spool 12, ejects an emptied cassette shell 63 separated from the exposed film 13 to shift it from the film pull stage 45 to a cassette conveyor 66, which consists of conveyor belts for conveying the emptied cassette shell 63 to a film wind-up section 70.

Figure 3:
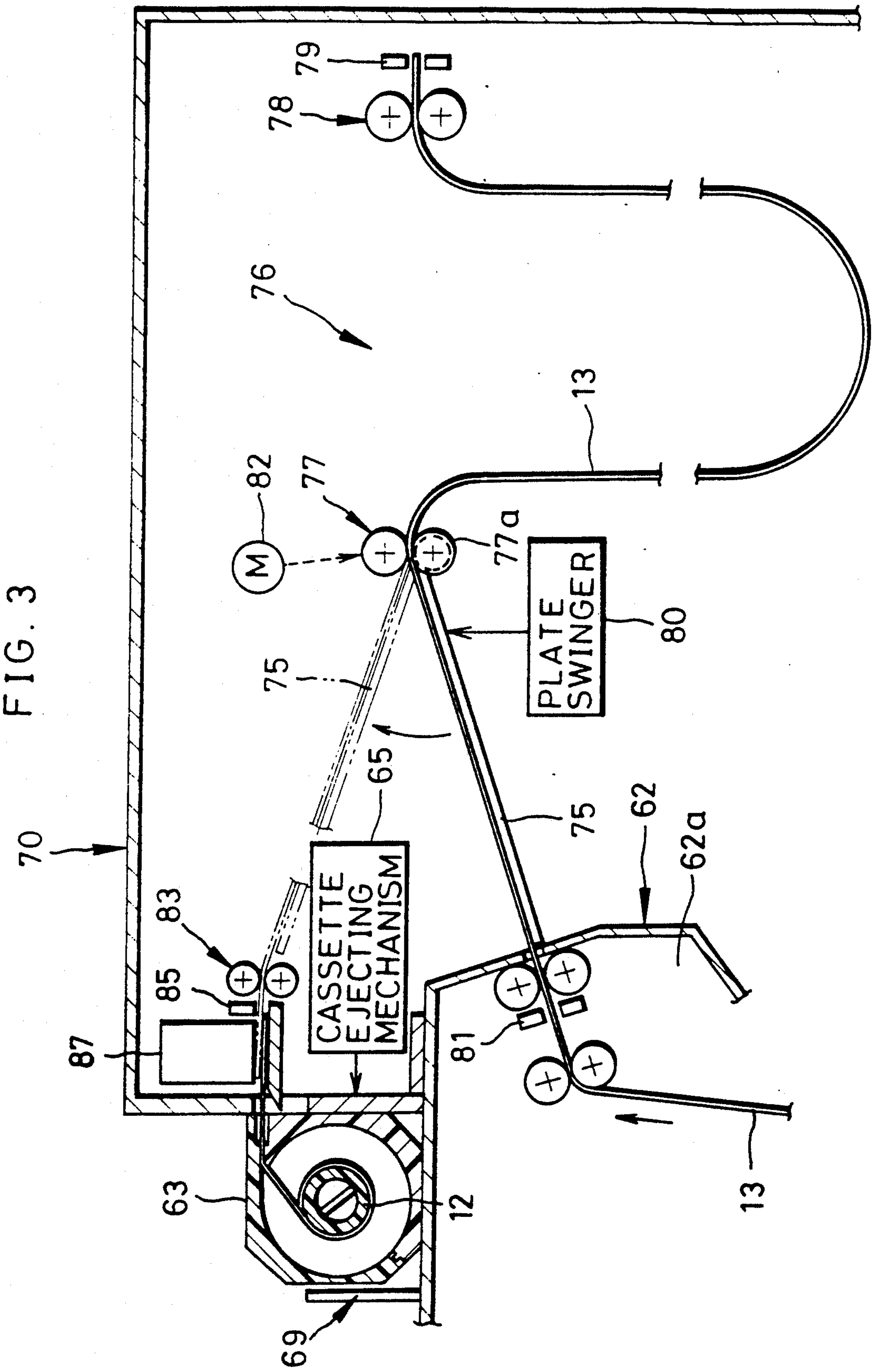
FIG. 3 is a schematic view of a film wind-up section of the film processor shown in FIG. 1.
Figure 4:
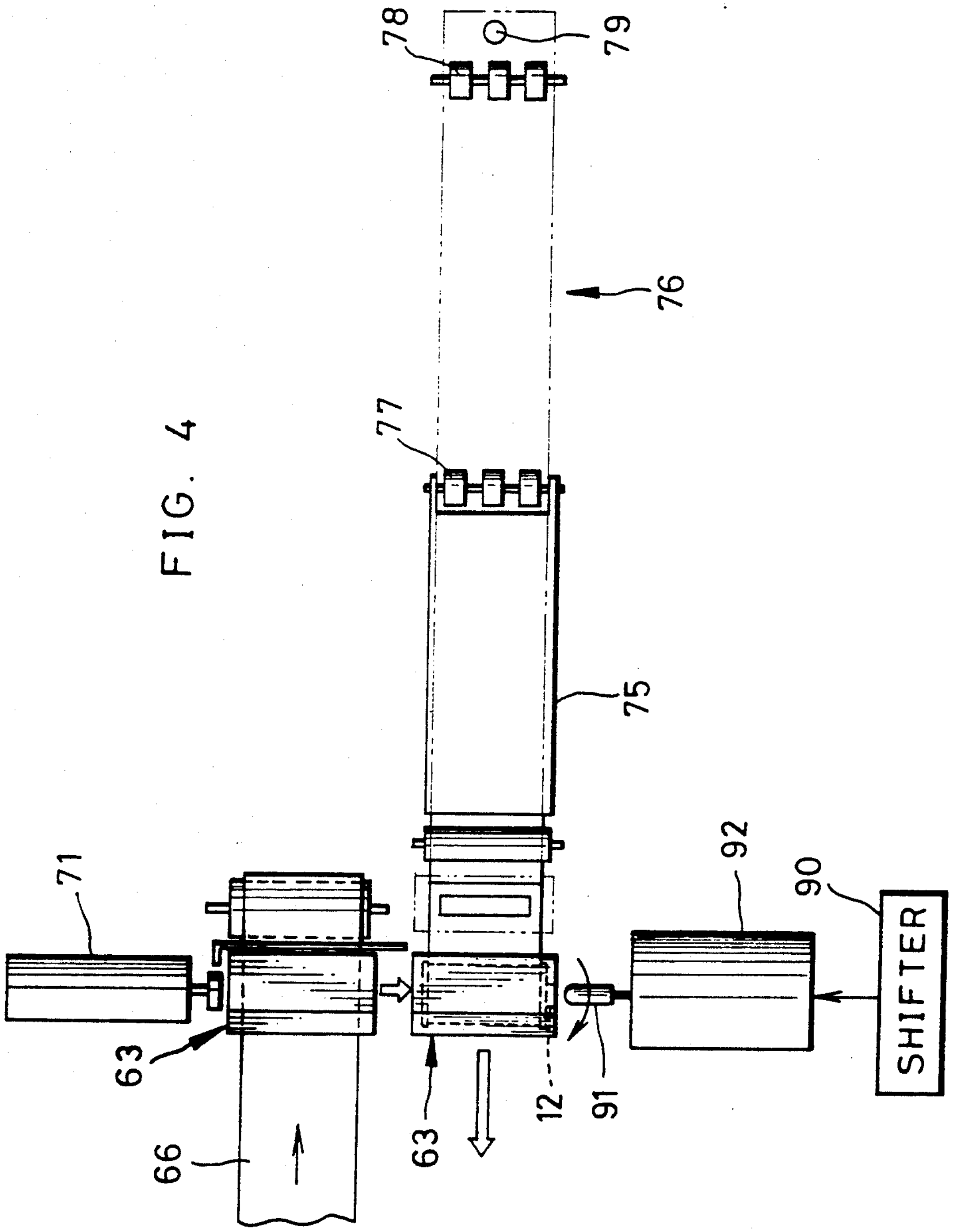
FIG. 4 is a plan view of the film wind-up section shown in FIG. 1.

In FIG. 3, the film wind-up section 70, disposed in the position downstream from the film processor, winds up the developed film 13 into the emptied cassette shell 63 positioned in a film wind-up stage 69. As shown in FIG. 4, the cassette conveyor 66 conveys the emptied cassette shell 63 to the side of the film wind-up stage 69. The emptied cassette shell 63, conveyed to an end of the cassette conveyor 66, is shifted by a cassette shifting mechanism 71 toward the film wind-up stage 69.

Referring again to FIG. 3, a swingable guide plate 75, disposed to receive the developed film 13 from an outlet of a drying tank 62a of the processor section 62, guides the developed film 13 let out of the drying tank 62a to a film reservoir 76. The reservoir 76 is provided with two pairs of nip rollers 77 and 78 to reserve or store the developed film 13 in the shape of a loop between the pairs of the rollers 77 and 78. A leading end sensor is disposed beyond the nip rollers 78 along the film passageway. Upon generating a signal indicating detection of the leading end of the developed film 13 from the leading end sensor 79, the rotation of the nip rollers 78 is stopped, while the nip rollers 77 continue to rotate so as to store the developed film 13 in the reservoir 76 in a loop. A motor 82 rotates the nip rollers 77.

The guide plate 75 is swingably supported axially on a shaft of a lower roller 77a of the downstream nip rollers 77. A plate swinger 80 displaces the guide plate 75 between two positions, one for guiding the film leader 13a to the reservoir 76, and another for guiding a rear end of the developed film 13 reversely toward the emptied cassette shell 63.

The guide plate 75 is swung in accordance with a signal indicating detection of the film rear end, that signal being generated from a film end sensor 81. The guide plate 75 normally is set in a lower disposition of the side of the processor section 62 by the plate swinger 80, and is swung to an upper disposition of the side of the film wind-up stage 69 when detecting the film rear end by the plate swinger 80. After swinging the guide plate 75 upwardly, the nip rollers 77 rotate in a direction reverse to that for storing the developed film as well as the direction a pair of feeding rollers 83 rotate, so that the developed film 13 is fed to the emptied cassette shell 63. The film transportation is controlled according to a signal indicating detection of the film rear end from a film end sensor 85, so as to position the film rear end on the hot-melt adhesive area 23 on the connecting sheet of the emptied cassette shell 63. The splicing unit 87 is provided with a thermal head to be lowered for melting the layer in the hot-melt adhesive area 23 on a connecting sheet of the emptied cassette shell 63 so as to adhere the connecting sheet by pressure to the trailing end of the developed film 13.

A rotary shaft 91 rotates the spool 12 in the direction of winding up the developed film 13 to contain the developed film 13 in the emptied cassette shell 63 in a roll. The rotary shaft 91 is constituted of a motor 92 and a shifter 90 in the same manner as the fork 46 for letting out the exposed film 13. The shifter 90 inserts the rotary shaft 91 in the coupling end 12a of the spool 12. The motor 92 rotates the spool 12 in the film wind-up direction so as to wind up the developed film 13 in the emptied cassette shell 63.

Figure 5:
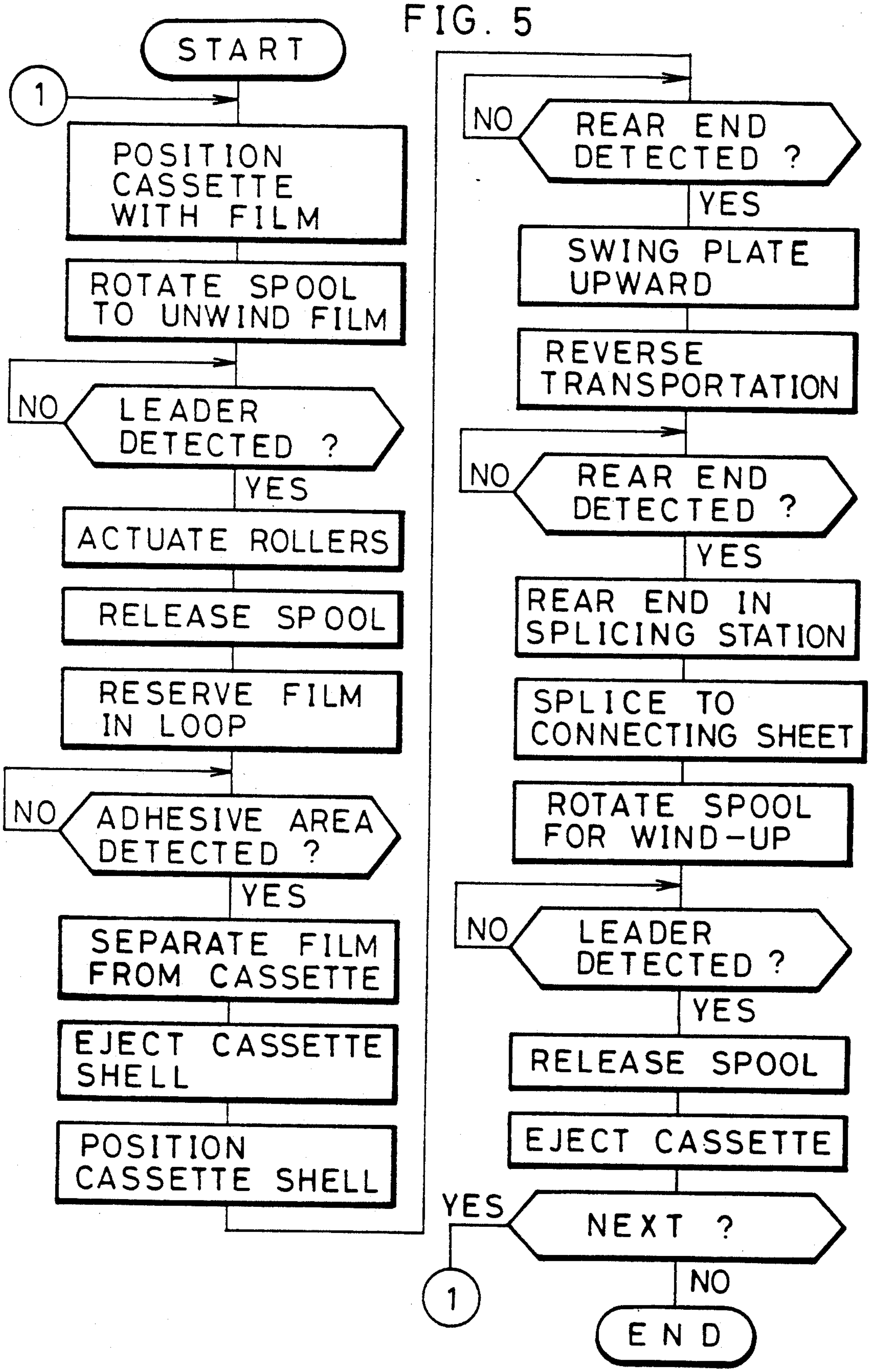
FIG. 5 is a flowchart schematically showing the method using the film processor shown in FIG. 1.

The operation of the present embodiment now will be described with reference to a flowchart shown in FIG. 5. First, the film cassette 10 is inserted in the cassette holder 31 as shown in FIG. 2. A plurality of film cassettes are lapped one over another in the cassette holder 31 in a state stopped by the lower stopper pins 33. The solenoid 40 of the cassette feeding mechanism 32 is actuated so that the single film cassette 10 between the stopper pins 33 and 34 is positioned in the film pull stage 45. The fork 46 is shifted axially by the shifter 47 as shown in FIG. 1. While the fork 46 is coupled with the coupling end 12a, the motor 48 is rotated to rotate the spool 12 in the unwinding direction to advance the film leader 13a. The exposed film 13 with the film leader 13a advanced is fed along the feeding passage 51 as shown in FIG. 2. The rotation of the drawing and feeding rollers 58 and 59 is controlled in order to store the exposed film 13 between the rollers 58 and 59 at a length corresponding to the time necessary to cut the film trailer, and then in order to feed the exposed film 13 into the processor section 62.

When the whole length of the exposed film 13 is drawn out of the cassette shell 11 during development, the hot-melt adhesive area 23 is detected by the sensor 56, which generates a detecting signal to actuate the cutter 57, which cuts the exposed film 13 in front of the hot-melt adhesive area 23. After cutting the exposed film 13 away from the cassette shell 11, the cassette shell 11 or the emptied cassette shell 63 is ejected from the film pull stage 45 to the cassette conveyor 66 by the cassette ejecting mechanism 65. The emptied cassette shell 63 is fed to the film wind-up stage 69 in the film windup section 70 by the cassette conveyor 66 and the cassette shifting mechanism 71.

The sensor 81 detects that the film rear end is let out of the drying tank 62a after developing the whole exposed film 13 as shown in FIG. 3. The guide plate 75 is swung from the side of the processor section 62 to that of the film wind-up stage 69. The developed film 13 is transported reversely until the film rear end is positioned in the splicing station on the splicing unit 87 in accordance with a signal from the sensor 85. The film rear end is adhered to the connecting sheet of the emptied cassette shell 63 in the splicing unit 87 by use of the hot-melt adhesive area 23.

The spliced developed film is wound up in the emptied cassette shell 63 by rotating the spool 12. After winding up the developed film 13, the cassette shell 63 is ejected from the film wind-up stage 69 by the cassette ejecting mechanism 65. Another emptied cassette shell 63 is positioned in the film wind-up stage 69 in a similar manner. The same process of development is repeated. A developed film is wound up and contained in the cassette shell 63.

It is noted that, although an originally used film cassette is conveyed to the film wind-up stage and is used for containing the developed film, a great number of emptied cassette shells 63 may be prepared or collected beforehand and stored in a cassette holder 130 so as to be fed one by one on a film wind-up stage.

Although the above embodiment is applied to the film cassette 10 in which rotation of the spool can cause a film end to advance to the outside, it may be applied to a conventional film cassette. Although the exposed film is drawn out of the film cassette 10 individually and guided to the processor section 62, a guiding leader sheet may be used, and attached to the advanced film leader in order to guide the exposed film to respective processing tanks.

Also, although applied to a film processor, the present embodiment may be applied to a photofinishing machine with a printer connected to a film processor. Instead of using a film portion attached to the spool as connecting sheet, a specialized connecting sheet may be attached to the spool 12 and the film trailer of the photographic film 13. Although the developed film 13 is attached to the connecting sheet of the cassette shell 63 by use of the hot-melt adhesive area 23, the developed film may be attached thereto with splice tape or the like.

Although the film rear end is spliced to the connecting sheet of the emptied cassette shell 63 to wind up the developed film in the same direction as that before development in the present embodiment, alternatively the leading end may be spliced to the connecting sheet. Also, although the emptied cassette shell 63 separated from the photographic film 13 is conveyed automatically to the film wind-up stage 69 through the cassette conveyor 66 in the present embodiment, alternatively an emptied cassette shell may be manually placed in the film wind-up stage 69.

Finally, although the present invention has been described fully by way of preferred embodiments with reference to the accompanying drawings, various changes and modifications will be apparent to those having working skill in this field. Therefore, unless these changes and modifications depart from the scope of the present invention, they should be construed as included therein.

What is claimed is:

1. A method for containing a developed photographic film in a cassette including a rotary spool contained in a cassette shell and a connecting sheet of which a first end is fixed on said spool, and a second, opposite end is drawn out from said cassette shell beforehand through a film passage mouth of said cassette, said method comprising the steps of:

connecting said developed film to said second end of said connecting sheet drawn out of said cassette shell; and rotating said spool to wind up said developed film in said cassette shell with said connecting sheet.

2. A developed photographic film containing method as defined in claim 1, further comprising:

before developing said photographic film after exposure, drawing said exposed photographic film out of said cassette shell; and cutting said exposed film on a film trailer, so as to separate said exposed film into a first portion, and a second portion left on said spool, with a front end of said second portion being drawn out, said second portion being provided as said connecting sheet.

3. A developed photographic film containing method as defined in claim 2, further comprising applying a hot-melt adhesive agent to said photographic film in a position so as to be said front end of said second portion.

4. A developed photographic film containing method as defined in claim 2, further comprising advancing a film leader outside said cassette shell by rotating said spool in a direction of unwinding of said photographic film.

5. A developed photographic film containing method as defined in claim 4, further comprising connecting a rear end of said first portion, formed by cutting said photographic film, to said front end of said second portion.

6. A developed photographic film containing method as defined in claim 5, further comprising, during development of said photographic film, conveying said cassette separated from said first portion to a connecting station for connecting said first portion thereto after development.

7. A developed photographic film containing method as defined in claim 4, further comprising the steps of:

inserting said cassette in a cassette holder provided in a film processor;

rotating said spool of said cassette inserted in said cassette holder in said unwinding direction in order to advance said film leader through said film passage mouth; and drawing out said film leader advanced out of said film passage mouth in order to develop said exposed film.

8. A developed photographic film containing method as defined in claim 7, further comprising the steps of:

shifting a lowest one of said plurality of cassettes held in said cassette holder outside said cassette holder after drawing out said photographic film; and conveying said cassette shifted out of said cassette holder to a connecting station for connecting said developed film thereto.

9. A developed photographic film containing method as defined in claim 8, further comprising the steps of:

storing said photographic film in a reservoir provided in a film wind-up section after development;

changing over a passage formed between an inlet of said film wind-up section and said reservoir for passing said developed film to passage formed between said connecting station and said reservoir; and transporting said developed film from said reservoir to said connecting station in a direction opposite a direction toward said reservoir.

10. A developed photographic film containing method as defined in claim 9, further comprising providing beforehand a hot-melt adhesive layer on said photographic film along a line on which said photographic film is cut, in order to connect said first portion after development to said second portion.

11. A developed photographic film containing method as defined in claim 10, wherein said hot-melt adhesive layer is provided along said front end of said second portion.

12. An apparatus for containing a developed photographic film in a cassette including a rotatable spool contained in a cassette shell and a connecting sheet of which a first end is fixed on said spool, and a second, opposite end is drawn out of said cassette shell beforehand through a film passage mouth, said apparatus comprising:

means for connecting an end of said developed film positioned in a connecting station to said second end of said connecting sheet; and means for winding up said developed film in said cassette by rotating said spool after connecting said developed film.

13. A containing apparatus as defined in claim 12, further comprising a reservoir for storing said developed film, said reservoir including:

a guide plate for guiding said developed film inserted from an inlet of said reservoir;

a pair of feeding rollers for nipping at least a middle portion of said developed film guided by said guide plate;

changeover means for changing over connection of said guide plate to said inlet of said reservoir to a connection to a connecting station; and a motor for rotating said feeding rollers forwardly when storing said developed film and for rotating said feeding rollers reversely when transporting said stored developed film to said connecting station along said guide plate.

14. A containing apparatus as defined in claim 13, wherein said developed film is stored in a shape of loop in a nip of said feeding rollers.

15. In a film processor for processing photographic film contained in a cassette, said cassette including a rotatable spool contained in a cassette shell and a connecting sheet of which a first end is fixed on said spool, and a second, opposite end is drawn out from said cassette shell beforehand through a film a film passage mouth of said cassette, said film processor further comprising:

spool rotating means provided in said film processor for rotating said spool in said unwinding direction, said spool rotating means including:

a motor;

a shaft mounted on said motor for transmitting rotation of said motor to said spool; and means for shifting said shaft in an axial direction in order to connect said shaft to said spool;

an apparatus for containing a developed photographic film in said cassette, said apparatus comprising:

means for connecting an end of said developed film positioned in a connecting station to said second end of said connecting sheet; and means for winding up said developed film in said cassette by rotating said spool after connecting said developed film.

16. Apparatus as defined in claim 15, wherein film drawing means provided in said film processor for drawing out said film leader includes a pair of rollers for transporting said film leader by nipping the same.

17. Apparatus as defined in claim 16, wherein said film processor includes a cassette holder for holding a plurality of cassettes which are vertically lapped one over another while keeping said spool horizontal.

18. A photographic film cassette comprising:

a cassette shell;

a rotatable spool contained in said cassette shell;

a photographic film wound in said cassette shell with an end fixed on said spool;

a film passage mouth formed on said cassette shell for passing said photographic film therethrough; and a hot-melt adhesive layer formed on said photographic film at a position close to said film passage mouth when said photographic film is fully drawn out of said film passage mouth, said hot-melt adhesive layer connecting said photographic film separated from said cassette shell in development again to said spool in order to rewind said photographic film within said cassette shell.

19. A photographic film cassette as defined in claim 18, further comprising means for causing a film leader to advance outside said cassette shell by rotating said spool in a direction of unwinding said photographic film.

20. A photographic film cassette as defined in claim 19, wherein a rear end formed by cutting said photographic film after development is connected to a front end of a portion of said photographic film left on said cassette shell.

21. A photographic film cassette as defined in claim 20, wherein said hot melt adhesive layer serves as a reference point for cutting said photographic film so as to separate said photographic film from said spool.

* * * * *